United States Patent Office 2,969,348
Patented Jan. 24, 1961

2,969,348

ETHYLENE POLYMERIZATION CATALYST
AND PROCESS

William L. Fawcett, Bartlesville, Okla., assignor to Phillips Petroleum Company, a corporation of Delaware No Drawing. Filed Aug. 20, 1956, Ser. No. 605,197

14 Claims. (Cl. 260—94.9)

This invention relates to the polymerization of ethylene. In one aspect, it relates to novel polymerization catalysts comprising chromium oxide, containing hexavalent chromium, and an oxide of nickel associated with a carrier. In another aspect, the invention relates to a process for the preparation of solid polymers of ethylene in the presence of the aforementioned catalysts.

In is an object of this invention to provide novel catalysts for polymerizing ethylene to solid polymers.

Another object of this invention is to provide an improved process for polymerizing ethylene to provide solid polymer products.

Still another object of this invention is to polymerize ethylene to provide solid polymer products of enhanced flexibility.

Yet another object of the invention is to provide a process for polymerizing ethylene in the presence of novel catalysts to obtain a solid polymer product.

These and other objects of the invention will become more readily apparent from the following detailed description and discussion.

The foregoing objects are broadly achieved by polymerizing ethylene in the presence of a catalyst comprising chromium oxide, containing hexavalent chromium, and an oxide of nickel associated with a carrier, to obtain a solid product. The presence of at least about 0.1 weight percent of hexavalent chromium, based on total catalyst, is preferred because maximum catalyst activity is thus obtained.

In a particular embodiment, the catalyst comprises nickel oxide and chromium oxide, containing hexavalent chromium, supported on silica-alumina.

The polymers of this invention are obtained by the polymerization of ethylene in the presence of a catalyst at an elevated temperature, preferably in the presence of a solvent or diluent material. The reaction is carried out usually at a temperature of between about 150° F. and about 325° F. and preferably in the range of about 170° F. to 270° F. The polymerization pressure is usually maintained at a sufficient level to assure a liquid phase reaction, that is at least about 100 to 300 p.s.i.g., depending on the polymerization temperature. High pressure up to 500 to 700 p.s.ig. or higher can also be used if desired The reaction can also be carried out in the gaseous phase, in which case the pressure can be as low as atmospheric. The feed rate in a liquid phase process with a fixed bed catalyst can vary from as low as about 0.1 to as high as about 20 volumes of feed per volume of catalyst with the preferred range being between about 1 and 6 volumes per volume.

The use of a diluent in the polymerization reaction in general serves two purposes. Since the reactions are exothermic the presence of a quantity of diluent provides a method for obtaining close control of the reaction temperature. In addition, polymers formed in the reaction or a portion thereof may be tacky and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general the paraffin hydrocarbons. Among the more useful solvents are acyclic alkanes having between about 3 and about 12 carbon atoms per molecule, such as, for example, propane, isobutane, n-pentane, isopentane, isooctane, etc., and preferably those acyclic alkanes having 5 to 12 carbon atoms per molecule. Also useful in the polymerization reaction are cycloalkanes, such as cyclohexane, methylcyclohexane, etc. Aromatic diluents are not normally used because they (or impurities therein) tend to shorten the catalyst life. However, if catalyst life is not an important factor in the process, solvents of an aromatic nature can also be employed. All of the foregoing and, in addition, other hydrocarbon diluents which are relatively inert and in the liquid state at the reaction conditions may also be employed in carrying out the reaction of olefins to form solid polymers.

The polymerization reaction can be carried out either as a fixed bed or a moving bed operation. One preferred method of conducting the reaction comprises contacting the ethylene feed with a slurry of catalyst suspended in the solvent or diluent. The catalyst is preferably maintained in suspension by suitable means such as mechanical agitation with a stirrer. In this type of operation the effluent from the reaction zone in addition to polymer contains catalyst and solvent, both of which must be removed from the product. The recovered solvent preferably is recycled to the reaction zone. The catalyst may also be reused, usually after regeneration in an oxygen-containing atmosphere to remove residual carbonaceous deposits. In the moving bed type of process the liquid feed rate is usually maintained in the range of between about 2 and 6 volumes per volume per hour, the olefin concentration in the hydrocarbon feed in the range of about 0.1 to about 25 weight percent and the catalyst rate in the range of about 0.1 to about 0.5 volumes per volume per hour.

The catalysts of this invention comprise an oxide of nickel in combination with chromium oxide, these oxides being supported on silica-alumina. The chromium component of the catalyst, to have maximum effectiveness for the preparation of the polymers of this invention, should contain hexavalent chromium. Preferably the amount of chromium which is present in the hexavalent state is at least 0.1 percent by weight of the catalyst composite as determined by ascertaining the water soluble chromium by leaching with water and determining the dissolved chromium in the leachings.

A preferred supporting material is a silica-alumina composite containing a major proportion of silica and a minor proportion of alumina. In general, silica-aluminas prepared by any of the processes well known in the prior art are suitable for the purpose of this invention. One support that has been found particularly effective is a coprecipitated 90% silica-10% alumina support. It has been found that steam treatment of this supporting material improves the activity and life of the catalyst composite in the polymerization reaction. A typical example of such a treatment involves contacting the catalyst with steam at a temperature of approximately 1100 to 1300° F. for a period of between about 4 and about 15 hours, with steam diluted with about 90 to about 97 percent air. It has also been found that the effect of the catalyst composite in the polymerization reaction can be improved by pretreating the catalyst support with a fluoride, in aqueous or non-aqueous solution, followed by heating, for example, at 300 to 1100° F. for from 0.5 to 10 hours to remove residual fluoride.

The catalysts of this invention are prepared by co-impregnation of the carrier with the nickel-oxide and chromium oxide or by physically mixing nickel oxide disposed on a carrier material with chromium oxide also disposed on the carrier. Starting materials comprise soluble salts such as nickel nitrate, nickel chloride, nickel sulfate and the like.

The chromium can be introduced to the catalyst as a solution of chromium trioxide, chromic nitrate, chromic acetate, chromic chloride, chromic sulfate, ammonium chromate, ammonium dichromate or other soluble salts of chromium. As previously stated, the supporting material can be prepared by various prior art processes such as, for example, coprecipitation and impregnation. These processes are well known and have been thoroughly described in the previous art in numerous instances.

When preparing the catalysts of this invention, such as for example by coimpregnation, a solution of a salt of nickel and chromium trioxide is contacted with the support for a sufficient period of time to impregnate the support. Following this, excess liquid is removed, for example by filtering, after which the solid catalyst is dried. The drying operation is carried out at a temperature above the boiling point of water and preferably not exceeding about 300° F. and for a period of time sufficient to remove the major portion of water. Usually this operation requires between about 0.5 and about 20 hours. Following this, the catalyst is activated by heating preferably under nonreducing conditions, generally in the presence of oxygen, usually in air, at increasing temperatures up to 1500° F., usually about 950° F. This operation can also be carried out under reducing conditions provided that the hexavalent chromium content of the activated catalyst is at least 0.1 percent by weight. This portion of the catalyst preparation step is usually carried out over a period of between about 3 and about 10 hours, utilizing dry air (e.g. dew point below 0° F.). Inasmuch as moisture poisons the catalyst, it is desirable that cooling and storage of the catalyst following activation be carried out in the presence of dry air or a dry inert gas such as nitrogen. The drying and activation steps are similar to those described in detail in a copending application of Hogan and Banks, Serial No. 573,877, filed March 26, 1956, now United States Patent 2,825,721 (1958).

When the catalysts are prepared by mixing nickel oxide deposited on a carrier material with chromium oxide also deposited on a carrier material, the two components of the mixture are prepared by a procedure similar to that used in preparing the co-impregnated catalyst, that is by impregnating the support with a salt of the metal, followed by filtration, drying and activation. The two components are mixed by any conventional means which is suitable for providing uniform distribution of each component in the mixture. The catalyst mixture can be prepared before the catalyst is admitted to the reaction zone or the two components can be separately introduced to said zone. A detailed method of preparing the chromium oxide-containing component of the mixed catalyst of this invention is disclosed in a copending application of Hogan and Banks, Serial No. 573,877, filed March 26, 1956, now United States Patent 2,825,721 (1958).

In general, the amount of metal oxides in the catalyst composite ranges from between about 0.5 and about 10 percent by weight expressed as the metal. Preferably, the concentration of nickel and chromium is between about 1 and about 4 weight percent of the total catalyst. The ratio of nickel to chromium can vary over a wide range, i.e. between about 0.05 to 1 and about 15 to 1 by weight. It has been found that the properties of the catalyst are affected by the method of catalyst preparation. Thus, when using coimpregnated catalyst, it is desirable to maintain the mol ratio of nickel to chromium between about 1.5 to 1 and about 15 to 1 and preferably between about 2 to 1 and about 4 to 1. For the mixed catalyst on the other hand, the mol ratio of nickel to chromium is generally maintained in the range of about 0.05 to 1 to 8 to 1 and preferably between about 0.2 to 1 and 2 to 1.

As previously stated, the catalyst of this invention after its initial use in the polymerization reaction and removal from the reaction zone effluent can be recycled to the reaction chamber for further use or it can be discarded. When it is desired to reuse the catalyst, the catalyst is first washed with a hydrocarbon solvent, such as pentane or isooctane, at a temperature in the range of 300 to 400° F. under sufficient pressure to maintain the solvent in the liquid phase. Following this, any remaining solid polymer or disposed carbonaceous material is burned from the catalyst with air, preferably at a temperature in the range of between about 900 and 1100° F. The catalyst is then returned to the reaction zone.

The product of the polymerization reaction comprises principally solid polymer with small amounts of tacky or liquid polymer. As used herein, the term "solid polymer" is intended to include that portion of the polymerization product which is normally solid.

The solid polymers produced herein are characterized by their high degree of flexibility as evidenced by low values of flex temperature and stiffness and high values of percent elongation. In addition, the polymers have very high stress cracking values, i.e. high resistance to cracking under deforming stress in the presence of certain chemicals, ranging between about 650 hours to 1000 hours and higher. The polymers prepared by the use of coimpregnated catalyst are particularly desirable and have elongation values between about 100 and about 200 percent and stress cracking values exceeding 1000 hours.

The solid polymer products of this invention are utilized generally in applications where solid plastics are used. They can be molded to form articles of any desired shape, for example, bottles and other containers for liquids. Because of their high degree of flexibility and especially in view of their stress cracking properties, they are particularly useful in the formation of pipe or tubing.

The following examples and tests are presented in illustration of the catalysts, polymerization process and polymer products of the invention.

METHODS OF CATALYST PREPARATION

Catalyst 1

A solution of nickel nitrate ($Ni(NO_3)_2$) and chromium nitrate ($Cr(NO_3)_3$) in distilled water made made to give a concentration of 0.38 molal with respect to nickel and 0.38 molal with respect to chromium. Two hundred (200) ml. of 30–50 mesh 90/10 silica-alumina were stirred in 300 ml. of this solution for five minutes. The excess solution was drained off using a Buchner funnel and an aspirator which was allowed to pull on the catalyst for ½ hour. The catalyst was then dried with constant agitation in an evaporating dish on a hot plate to about 220° F. following which it was activated in a furnace for five hours at 950° F. with a 500 space velocity of dry air through the catalyst. The catalyst was allowed to cool in the presence of dry air and stored under prepurified nitrogen. The catalyst contained 2.96 weight percent nickel oxide plus chromium oxide measured as elemental nickel and chromium had a mol ratio of nickel to chromium of 0.83.

*Catalysts II–V*

These catalysts were prepared by following substantially the same procedure as was followed in the preparation of Catalyst I. The final catalyst compositions were as follows:

Catalyst II contained 2.71 weight percent nickel oxide plus chromium oxide measured as the elemental metals and had a mol ratio of nickel to chromium of 2.15.

Catalyst III contained 3.68 weight percent nickel oxide plus chromium oxide measured as the elemental metals and had a mol ratio of nickel to chromium of 2.51.

Catalyst IV contained 3.82 weight percent nickel oxide plus chromium oxide measured as the elemental metals and had a mol ratio of nickel to chromium of 3.50.

Catalyst V contained 3.15 weight percent nickel oxide plus chromium oxide measured as the elemental metals and had a mol ratio of nickel to chromium of 6.45.

*Catalyst VI*

A solution of nickel nitrate ($Ni(NO_3)_2$) in distilled water was made to give a concentration of 0.76 molal. 200 milliliters of 30 to 50 mesh 90/10 silica-alumina were stirred in 300 milliliters of this solution for five minutes. The excess solution was drained off using a Buchner funnel and an aspirator which was allowed to pull on the catalyst for ½ hour. The catalyst was then dried with constant agitation in an evaporating dish on a hot plate to about 220° F. following which it was activated in a furnace for five hours at 950° F. with a 500 space velocity of dry air through the catalyst. The catalyst was allowed to cool in the presence of dry air and stored under prepurified nitrogen.

A solution of chromium nitrate ($Cr(NO_3)_3$) in distilled water was made to give a concentration of 0.76 molal. 300 milliliters of 30 to 50 mesh 90/10 silica-alumina were stirred in 200 milliliters of this solution for five minutes. This material was then filtered, dried and activated in substantially the same manner as the nickel nitrate-silica alumina solution to provide an activated chromium oxide on silica alumina. 1.5 parts of the nickel oxide catalyst and 1.6 parts of the chromium oxide catalyst were then physically mixed to provide a catalyst mixture containing 2.55 weight percent of nickel oxide plus chromium oxide measured as the elemental metals and having a mol ratio of nickel to chromium of 0.89.

*Catalyst VII*

This catalyst was prepared in substantially the same manner as catalyst VI to provide a final catalyst containing 2.50 weight percent nickel oxide plus chromium oxide measured as the elemental metals, having a mol ratio of nickel to chromium of 0.24.

*Catalyst VIII*

This catalyst was prepared in substantially the same manner as catalyst VI and VII. The final catalyst contained 2.50 weight percent nickel oxide plus chromium oxide measured as the elemental metals and had a mol ratio of nickel to chromium of 0.22.

*Catalyst IX*

An activated nickel oxide supported on silica alumina was prepared by following substantially the same procedure used in the preparation of catalyst VI. 70 grams of this material were stirred in 108 milliliters of chromium nitrate ($Cr(NO_3)_3$) in distilled water having a concentration of 0.74 molal for five minutes. The excess solution was drained off using a Buchner funnel and an aspirator which was allowed to pull on the catalyst for ½ hour. The catalyst was then dried with constant agitation in an evaporating dish on a hot plate to about 220° F. following which it was activated in a furnace for five hours at 950° F. with a 500 space velocity of dry air through the catalyst. The catalyst was allowed to cool in the presence of dry air and stored under prepurified nitrogen. The catalyst contained 4.98 weight percent nickel oxide plus chromium oxide measured as the elemental metals and had a mol ratio of nickel to chromium of 0.58.

*Catalyst X*

A solution of chromium nitrate ($Cr(NO_3)_3$) in distilled water was made to give a concentration of 0.76 molal. 300 milliliters of 30 to 50 mesh 90/10 silica alumina was stirred in 200 milliliters of this solution for five minutes. This material was then filtered, dried and activated in substantially the same manner as catalysts I–IX to provide an activated chromium oxide on silica alumina. The final catalyst contained 2.46 weight percent chromium in the form of oxide.

In catalysts I–V the hexavalent chromium comprised about 86 percent of the total chromium.

In catalysts VI–VIII the hexavalent chromium comprised about 89 percent of the total chromium.

In catalyst IX the hexavalent chromium comprised about 78 percent of the total chromium.

In catalyst X the hexavalent chromium comprised about 89 percent of the total chromium.

A series of runs were carried out in a 1400 milliliter stirred reactor using the catalysts described and cyclohexane solvent. In each run all of the catalyst and all of the cyclohexane were charged to the reactor before operation was begun. Both the catalyst and the cyclohexane were introduced under a blanket of dry, air-free nitrogen. Following this, the heat was applied to the reactor and the cyclohexane was boiled free of fixed gases. The reactor was then closed and brought to the desired reaction temperature. Ethylene was introduced at a rate of 80 grams per hour until the reaction pressure was reached, then this material was allowed to flow into the reactor at a sufficient rate to maintain the pressure substantially constant. When the run was completed, the ethylene line was closed, the heat was removed and pressure was reduced, after which the polymer was removed, dried and weighed. Removal of catalyst was by filtration from cyclohexane solution of the reactor product at 300° F. During the run, the operating pressure was 450 p.s.i.g. and the run duration was approximately 5 hours. The catalyst concentration was about 0.6 percent of the solvent weight. The weight percent olefin was about 75 percent by weight as compared to the solvent.

When it was desired to remove the soluble fraction of the polymer, the filtrate from the catalyst filtration step was cooled to 80° F. to precipitate polymer and was then filtered. The insoluble polymer was reslurried twice in cyclohexane at room temperature and refiltered. The cyclohexane insoluble polymer was then dried in a vacuum at 210° F. For polymer which was to retain the soluble material, the hot filtrate from the catalyst removal was flashed into a vacuum chamber and the total polymer was dried under vacuum at 210° F.

The results of the runs carried out are presented in Table I.

TABLE I.—ETHYLENE POLYMERIZATION OVER NICKEL OXIDE-CHROMIUM OXIDE CATALYST

| Test No | 1 | 2 | 3 | | 4 | 5 | |
|---|---|---|---|---|---|---|---|
| Catalyst | (¹) | (¹) | (¹) | | (¹) | (¹) | |
| Catalyst No | I | II | II | | II | III | |
| Ni/Cr, molar ratio | 0.83 | | 2.15 | | | 2.51 | |
| Catalyst Conc., Wt. Percent | 0.41 | 0.50 | 0.48 | | 0.44 | 0.57 | |
| Reaction Temp., F | 240 | 240 | 240 | | 270 | 240 | |
| Reaction Time, Hrs | 4.12 | 5.75 | 5.18 | | 6.0 | 4.83 | |
| Reaction Rate, #/#/Hr | 11.2 | 13.0 | 18.7 | | 11.6 | 18.2 | |
| Polymer Properties: | | | | | | | |
| Soluble Solids | Retained | Retained | Retained | Removed | Retained | Retained | Removed |
| Soluble Solids, Wt. Percent | | | | 2.81 | | | 2.73 |
| Melt Index | 0.03 | 0.05 | 0.04 | 0.04 | 0.36 | 0.08 | 0.06 |
| Melting Point, F | 254±2 | | No Plateau | 245±3 | 246 | 242±3 | 248±2 |
| Density | 0.964 | | 0.945 | 0.946 | | 0.946 | 0.943 |
| Mol. Wt. (Vis.) | | | | 69,905 | | | 53,595 |
| Stiffness | | | 89,000 | 66,000 | | 66,700 | 99,800 |
| Flex Temp., F | | | +16 | +23 | | +34 | +14 |
| Flexural Rigidity | | | | 2.60 | | | 3.40 |
| Heat Dist., F | | | 148 | 164 | | 134 | 170 |
| Impact (Izod) | | 3.87 | 4.69 | 5.72 | 1.72 | 4.09 | 4.10 |
| Tensile Strength, p.s.i.— | | | | | | | |
| Comp. Mold | | 3,360 | 3,380 | 3,426 | 3,520 | 3,413 | 3,388 |
| Inj. Mold | | | 4,033 | 4,020 | | 4,117 | |
| Elongation, Percent: | | | | | | | |
| Comp. Mold | | 168 | 85 | 117 | 52 | 116 | 175 |
| Inj. Mold | | | 28 | 10 | | 40 | |
| Stress Cracking, Hrs | | | 1,000 | | | | |

| Test No | 6 | 7 | 8 | 9 | 10 | 11 | | 12 |
|---|---|---|---|---|---|---|---|---|
| Catalyst | (¹) | (¹) | Mixed | Mixed | Mixed | Cr on Ni | | Cr |
| Catalyst No | IV | V | VI | VII | VIII | IX | | X |
| Ni/Cr, molar | 3.50 | 6.45 | 0.89 | 0.24 | 0.22 | 0.58 | | 0 |
| Catalyst Conc., Wt. Percent | 0.6 | 0.55 | 0.57 | 0.88 | 0.88 | 0.61 | | 0.55 |
| Reaction Temp., F | 240 | 240 | 240 | 240 | 240 | 240 | | 240 |
| Reaction Time, Hrs | 4.0 | 4.0 | 5.5 | 5.0 | 4.55 | 4.83 | | 4.0 |
| Reaction Rate, #/#/Hr | 11.2 | 2.7 | 1.8 | 9.8 | 6.9 | 11.0 | | 18 |
| Polymer Properties: | | | | | | | | |
| Soluble Solids | Retained | Retained | Retained | Retained | Removed | Retained | Removed | Retained |
| Soluble Solids, Wt. Percent | | | | | 5.93 | | 1.34 | |
| Melt Index | 0.15 | | 2.88 | 0.40 | 0.27 | 0.01 | 0.02 | 0.06 |
| Melting Point, F | 244±2 | 240±2 | 244 | 242±2 | 249±2 | 249±3 | 252±3 | 252±2 |
| Density | 0.943 | 0.938 | 0.939 | 0.941 | 0.941 | 0.963 | 0.958 | 0.959 |
| Mol. Wt. (Vis.) | 55,600 | 42,275 | | | | 79,800 | | |
| Stiffness | | | | 66,000 | 77,200 | 117,000 | 126,000 | 115,000 |
| Flex Temp., F | −6 | | | +1 | −22 | | +50 | +51 |
| Flexural Rigidity | | | | 2.25 | | | | |
| Heat Distortion Temperature, °F | | | | 157 | 128 | 140 | 143 | 179 |
| Impact (Izod) | | | | 1.62 | 2.04 | 14.02 | 13.40 | 7.47 |
| Tensile Strength, p.s.i.— | | | | | | | | |
| Comp. Mold | 3,063 | | | 2,854 | 3,180 | 4,133 | 4,193 | 4,248 |
| Inj. Mold | | | | 3,408 | 3,752 | 4,919 | 5,856 | 5,468 |
| Elongation, Percent: | | | | | | | | |
| Comp. Mold | 112 | | | 42 | 60 | 35 | 54 | 43 |
| Inj. Mold | | | | 48 | 29 | 20 | 16 | 13 |
| Stress Cracking, Hrs | | | | | 650 | 420 | 110 | 105 |

¹ Coimpregnated.

Test methods

*Density* was measured on a compression molded polymer specimen by a flotation method. A mixture of methylcyclohexane and carbon tetrachloride was adjusted to the specific gravity of the specimen by floating the specimen in the mixture. The specific gravity of the suspending liquid was then measured with a Westphal balance.

*Heat distortion temperatures* were determined on injection molded specimens according to ASTM D 648–45T.

*Flex-temperature* is the lowest temperature limit of usefulness as a non-rigid plastic. It is the temperature at which the modulus of elasticity in torsion of the material is 135,000 p.s.i. Measurements were made according to ASTM D 1043–49T.

*Tensile strength* is the maximum tensile load per unit area of original cross section carried by the test specimen. Elongation is the extension recorded at the moment of rupture of the specimen expressed as a percentage of the original length of the measured elongating section. Measurements were made on the Instron tensile machine according to ASTM D 638–52T (injection molded specimen dimensions) and ASTM D 412–49T. Rate of pull was 20 inches per minute.

*Impact strength* (Izod) is a test for resistance to fracture by shock loading (ASTM D 256–42T).

*Melt index* is the rate of extrusion of a thermoplastic through an orifice of specified length and diameter under specified conditions of temperature and pressure. It was determined according to ASTM D 1238–52T.

*Flexural rigidity* is a simple flexibility test devised by D. G. Stechert of Gates Rubber Company and published at the 123rd national meeting of ACS in Los Angeles in 1953. The test utilized a ½ inch x ⅛ inch x 8¼ inch specimen which is bent into a U-shape between two parallel flat surfaces connected by a pantograph linkage. Knowing the force-producing curvature and the distance the specimen is bent, it is possible to calculate the flexural rigidity. The test is useful only for comparing rigidity of specimens of the same cross section (determined on injection molded tensile specimens).

*Environmental stress cracking* tests were made at 122 F. according to a method devised by De Coste, Malm and Wallder of Bell Telephone Laboratories (outlined in Ind. and Eng. Chem., 43, 117 (1951)). These tests measure the resistance of the polymers to cracking under polyaxial stress in a chemical environment. The chemical used was Igepal, which is alkylaryl polyethylene glycol ether.

*Brittleness temperature* tests were determined according to ASTM D 846–52T.

*Melting point.*—The melting point was determined by melting a sample of the polymer and allowing it to cool slowly, the temperature being plotted against time, to obtain a cooling curve. The temperature corresponding to a plateau in the cooling curve was taken as the melting point.

*Molecular weight.*—The molecular weights were calculated according to the equation:

$$M = \frac{4.03 \times 10^3 \times Ni \times 14}{2.303} = 24,500 Ni$$

where M is the weight average molecular weight and $Ni$ is the inherent viscosity as determined for a solution of 0.2 gram of the polymer in 50 cc. of tetralin at 130° C. See Ind. Eng. Chem. 35, 1108 (1943).

*Stiffness.*—Stiffness was determined according to D747–50.

It is to be noted that the catalysts of this invention (I–VIII) provide products having a very high degree of flexibility as compared to the chromium oxide catalyst (X) and the nickel oxide-chromium oxide catalyst prepared by impregnating nickel promoted silica-alumina with chromium oxide (IX). For example, the percent elongation (compression molded) of the products obtained using catalsts I–VIII are as high as 175 percent and average about 100 percent as compared to 35 to 50 percent for the polymers of catalysts IX and X. Improved flexibility is particularly noticeable in the products obtained by carrying out the polymerization reaction in the presence of the coimpregnated catalysts (I–V). It is also to be noted that the flex temperatures and stiffness values of the products of the catalysts of this invention are significantly lower than those produced with catalysts IX and X. Also significant is the stress cracking resistance of the polymers obtained in the presence of the nickel oxide-containing catalysts, particularly those polymers made in the presence of the coimpregnated catalyst.

The catalysts of this invention provide products containing a high percent of solid polymers. A typical analysis is presented in Table II:

TABLE II.—PRODUCT ANALYSIS OF ETHYLENE POLYMERIZATION OVER COIMPREGNATED NICKEL OXIDE-CHROMIUM OXIDE CATALYST (Ni/Cr MOL RATIO=2.51:1) AT 240° F.

| Component: | Weight percent reacted ethylene |
| --- | --- |
| 1-butene | 4.0 |
| 2-butene | 2.4 |
| Hexenes | 3.5 |
| Octenes | 0.2 |
| Decenes | 0.1 |
| Solid polymer | 89.8 |

Having thus described the invention by providing specific examples thereof, it is to be understood that no undue restrictions or limitations are to be drawn by reason thereof but that the scope of the invention is defined by the appended claims.

I claim:

1. A process for the production of a solid polymer having enhanced flexibility, which process comprises contacting ethylene, at a temperature in the range 150 to 325° F. with a catalyst active for ethylene polymerization and prepared by depositing nickel oxide upon one portion of silica-alumina, depositing chromium oxide upon a separate portion of silica-alumina, heating and mixing the composites thus obtained to obtain a hexavalent chromium content of said catalyst of at least 0.1 weight percent, the total of nickel plus chromium content in said catalyst being within the range 1 to 4 percent of the total catalyst weight, and the mol ratio of nickel to chromium in said catalyst being within the range 0.2:1 to 2:1.

2. A process for the production of a solid polymer having enhanced flexibility, which process comprises contacting ethylene, at a temperature in the range 150 to 325° F., in the presence of a hydrocarbon which is liquid and inert under the contacting conditions, with a catalyst prepared by depositing nickel oxide upon one portion of silica-alumina, depositing chromium oxide upon a separate portion of silica-alumina, heating each of the resulting composites to activate same for said process and leave at least 0.1 weight percent, based on total catalyst, of chromium in the hexavalent state, and mixing the resulting composites, the total nickel plus chromium content of the mixed catalyst being within the range 1 to 4 percent of the total catalyst weight, the mol ratio of nickel to chromium being in the range 0.2:1 to 2:1, and maintaining sufficient pressure during said contacting to maintain said hydrocarbon substantially in the liquid phase.

3. A process for the production of solid polymer having enhanced flexibility, which process comprises contacting ethylene, at a temperature in the range 150 to 325° F., with a catalyst active for ethylene polymerization and prepared by depositing both chromium oxide and nickel oxide directly upon the same portion of silica-alumina, heating to activate the catalyst for said process, at least 0.1 weight percent of the total weight of the heat-activated catalyst being hexavalent chromium, the total nickel plus chromium content of the catalyst being within the range 1 to 4 percent of the total catalyst weight and the mol ratio of nickel to chromium being within the range 2:1 to 4:1.

4. A process for the production of a solid polymer which process comprises contacting ethylene, at a temperature in the range 150 to 325° F., in the presence of a hydrocarbon which is inert and liquid under the contacting conditions, with a heat-activated catalyst prepared by depositing both nickel oxide and chromium oxide directly upon the same portion of silica-alumina and activating the resulting composite for said process by heating at an elevated temperature to leave at least 0.1 weight percent of chromium, based on total catalyst weight, in the hexavalent state, the total nickel plus chromium content of the catalyst being in the range 1 to 4 percent of the total catalyst weight, the mol ratio of nickel to chromium being in the range 1.5:1 to 15:1, and recovering a resulting polymer having enhanced flexibility.

5. A process for the production of solid polymer which process comprises contacting ethylene, at a temperature in the range 170 to 270° F. and a pressure in the range 100 to 700 p.s.i.g., in the presence of a cycloalkane, with a catalyst prepared by impregnating silica-alumina with an aqueous solution of nickel nitrate, impregnating a separate portion of said silica-alumina with an aqueous solution of chromic nitrate, drying, and calcining the resulting composites in dry air at a temperature in the range 900 to 1100° F. to activate the composites and leave at least 0.1 weight percent chromium, based on total catalyst, in the hexavalent state and mixing said composites together to obtain a mixed catalyst containing from 1 to 4 percent, based on total catalyst weight, of nickel plus chromium, the mol ratio of nickel to chromium being in the range 0.2:1 to 2:1, and recovering a resulting polymer having enhanced flexibility.

6. A process for the production of solid polymer which process comprises contacting ethylene, at a temperature in the range 170 to 270° F. and a pressure in the range 100 to 700 p.s.i.g., in the presence of a cycloalkane, with a catalyst prepared by impregnating silica-alumina with an aqueous solution containing both nickel nitrate and chromic nitrate, drying, and heating the resulting composite in dry air at a temperature in the range 900 to 1100° F. to activate the composite and leave at least 0.1 weight percent of chromium, based on total catalyst weight, in the hexavalent state, the total nickel plus chromium content of the finished catalyst being within the range 1 to 4 percent of the total catalyst weight, the mol ratio of nickel to chromium in the catalyst being in the range 2:1 to 4:1, and recovering a resulting polymer having enhanced flexibility.

7. As a new catalytic composition of matter, a mixture of nickel oxide supported on silica-alumina and chromium oxide supported on a separate portion of silica-alumina, the total nickel plus chromium content of said composition being in the range 0.5 to 10 weight percent, the molar ratio of nickel to chromium being in the range 0.05:1 to 8:1, and at least 0.1 weight percent of the total catalyst composition being chromium in the hexavalent state.

8. As a new catalytic composition of matter, a mixture of nickel oxide supported on silica-alumina and chromium oxide supported on a separate portion of silica-alumina, the total content of nickel plus chromium in said composition being in the range 1 to 4 weight percent, the molar ratio of nickel to chromium being in the range 0.2:1 to 2:1, and at least 0.1 weight percent of the total catalyst composition being chromium in the hexavalent state.

9. A process for the production of a solid polymer having enhanced flexibility, which process comprises contacting ethylene, at a temperature in the range 150 to 325° F., with a catalyst which is active for ethylene polymerization and which comprises nickel oxide and chromium oxide both directly supported on silica-alumina, the hexavalent chromium content of said catalyst being at least 0.1 weight percent based on total catalyst, and the mol ratio of nickel to chromium in said catalyst being in the range 0.05:1 to 8:1 when said catalyst is a mixture of nickel oxide on silica-alumina and chromium oxide on silica-alumina and in the range 1.5:1 to 15:1 when said catalyst is silica-alumina coimpregnated with nickel oxide and chromium oxide.

10. A process for the production of a solid polymer having enhanced flexibility, which process comprises contacting ethylene, at a temperature in the range 150 to 325° F., with a catalyst which is active for ethylene polymerization and which comprises nickel oxide and chromium oxide both directly supported on silica-alumina, the hexavalent chromium content of said catalyst being at least 0.1 weight percent based on total catalyst, and the mol ratio of nickel to chromium in said catalyst being in the range of 0.2:1 to 2:1 when said catalyst is a mixture of nickel oxide on silica-alumina and chromium oxide on silica-alumina and in the range 2:1 to 4:1 when said catalyst is silica-alumina coimpregnated with nickel oxide and chromium oxide.

11. A process for the production of a solid polymer having enhanced flexibility, which process comprises contacting ethylene, at a temperature in the range 150 to 325° F., with a catlalyst which is active for ethylene polymerization and which comprises nickel oxide and chromium oxide both directly supported on silica-alumina, the hexavalent chromium content of said catalyst being at least 0.1 weight percent based on total catalyst, the nickel plus chromium content of said catalyst being in the range 0.5 to 10 weight percent, based on total catalyst, and the mol ratio of nickel to chromium in said catalyst being in the range 0.05:1 to 8:1 when said catalyst is a mixture of nickel oxide on silica-alumina and chromium oxide on silica-alumina and in the range 1.5:1 to 15:1 when said catalyst is silica-alumina coimpregnated with nickel oxide and chromium oxide.

12. A process for the production of a solid polymer having enhanced flexibility, which process comprises contacting ethylene at a temperature in the range 150 to 325° F., with a catalyst active for ethylene polymerization and prepared by depositing nickel oxide upon one portion of silica-alumina, depositing chromium oxide upon a separate portion of silica-alumina, and heating and mixing the composites thus obtained, the hexavalent chromium content of said catalyst being at least 0.1 weight percent, based on total catalyst, the total nickel plus chromium content of said catalyst being in the range 0.5 to 10 weight percent, based on total catalyst, and the mol ratio of nickel to chromium in said catalyst being in the range 0.05:1 to 8:1.

13. A process for the production of a solid polymer having enhanced flexibility, which process comprises contacting ethylene, at a temperature in the range 150 to 325° F., with a catalyst active for ethylene polymerization and prepared by depositing both chromium oxide and nickel oxide directly upon the same portion of silica-alumina and activating the resulting composite by heating, the hexavalent chromium content of said catalyst being at least 0.1 weight percent, based on total catalyst, the total content of nickel plus chromium in said catalyst being 0.5 to 10 weight percent, based on total catalyst, and the mol ratio of nickel to chromium being in the range 1.5:1 to 15:1.

14. A process for the production of a solid polymer, which process comprises contacting ethylene, at a temperature in the range 150 to 325° F., in the presence of a hydrocarbon which is inert and liquid under the contacting conditions, with a heat-activated catalyst prepared by depositing both nickel oxide and chromium oxide directly upon the same portion of silica-alumina and activating the resulting composite for said process by heating at an elevated temperature to leave at least 0.1 weight percent of chromium, based on total catalyst weight, in the hexavalent state, the total nickel plus chromium content of the catalyst being in the range 1 to 4 percent of the total catalyst weight, the mol ratio of nickel to chromium being in the range 2:1 to 4:1, and recovering a resulting polymer having enhanced flexibility.

References Cited in the file of this patent

UNITED STATES PATENTS

| | | |
|---|---|---|
| 2,435,551 | Black | Feb. 3, 1948 |
| 2,510,189 | Nahin et al. | June 6, 1950 |
| 2,581,228 | Bailey | Jan. 1, 1952 |
| 2,666,756 | Boyd et al. | Jan. 19, 1954 |
| 2,691,647 | Field et al. | Oct. 12, 1954 |
| 2,750,261 | Ipateff | June 12, 1956 |
| 2,825,721 | Hogan et al. | Mar. 4, 1958 |

OTHER REFERENCES

Emmett: "Catalysis," vol. 1 (1954), pages 245–251, published by Reinhold Pub. Corp. (New York).